(12) United States Patent
Igi

(10) Patent No.: US 7,760,595 B2
(45) Date of Patent: Jul. 20, 2010

(54) OPTICAL DISC DEVICE

(75) Inventor: Yasumasa Igi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 490 days.

(21) Appl. No.: 11/905,336

(22) Filed: Sep. 28, 2007

(65) Prior Publication Data

US 2008/0094992 A1   Apr. 24, 2008

(30) Foreign Application Priority Data

Oct. 24, 2006   (JP) .............................. 2006-289183

(51) Int. Cl.
  *G11B 7/00* (2006.01)
(52) U.S. Cl. .................. 369/47.44; 369/47.4; 369/53.18
(58) Field of Classification Search .............. 369/47.44, 369/53.18
  See application file for complete search history.

(56) References Cited

U.S. PATENT DOCUMENTS 4,432,082 A * 2/1984 Hsieh et al. .............. 369/30.17
4,800,548 A * 1/1989 Koishi et al. ............. 369/53.18
5,627,811 A * 5/1997 Morita et al. ............... 369/47.4
5,701,284 A * 12/1997 Lee .......................... 369/47.44
6,118,743 A * 9/2000 Kumita ..................... 369/47.44

FOREIGN PATENT DOCUMENTS

JP   A-2005-278254   10/2005

OTHER PUBLICATIONS

JP 06-052629 english translation Tateishi Kiyoshi Feb. 25, 1994.*

* cited by examiner

*Primary Examiner*—Van N Chow
(74) *Attorney, Agent, or Firm*—Morgan Lewis & Bockius LLP

(57) ABSTRACT

An optical disc device includes: a spindle motor for rotating a disc; a motor driving circuit for applying a voltage to the spindle motor to drive the spindle motor; an optical pickup for irradiating the disc with an optical beam; and a detector for, after the motor driving circuit starts voltage application to the spindle motor, measuring a pit length based on reflection light, on the disc, of the optical beam irradiated by the optical pickup and then detecting based on a result of the measurement that the spindle motor is in short condition. In the optical disc device, upon detection by the detector that the spindle motor is in short condition, the motor driving circuit stops the voltage application to the spindle motor.

2 Claims, 4 Drawing Sheets

OPTICAL DISC DEVICE

This application is based on Japanese Patent Application No. 2006-289183 filed on Oct. 24, 2006, the contents of which are hereby incorporated by reference.

BACKGROUND OF THE INVENTION

1. Field of the Invention

The present invention relates to an optical disc device.

2. Description of Related Art

An optical disc device that performs reproduction and recording on an optical disc, such as a CD, a DVD, or the like, is provided with a spindle motor for rotating the optical disc. In this spindle motor, waste from brush abrasion may deposit between commutators, whereby a short may occur, disabling driving of the spindle motor. Thus, JP-A-2005-278254 discloses an optical disc device adapted to avoid a short between commutators by burning out waste from brush abrasion with a flow of a large current between the commutators.

However, with this optical disc device, the flow of a large current into the commutators does not necessarily completely burn out the waste from brush abrasion, presenting the following possible problem. A motor driving circuit applies a voltage to the spindle motor with a short occurring between the commutators and resulting overcurrent heats up the motor driving circuit, whereby the surrounding area of the motor driving circuit burns or melts, or fire occurs.

SUMMARY OF THE INVENTION

It is an object of the present invention to provide an optical disc device capable of avoiding heating of a motor driving circuit caused by overcurrent even when a spindle motor is in short condition.

To achieve the object described above, an optical disc device according to one aspect of the invention includes: a spindle motor for rotating a disc; a motor driving circuit for applying a voltage to the spindle motor to drive the spindle motor; an optical pickup for irradiating the disc with an optical beam; and a detector for, after the motor driving circuit starts voltage application to the spindle motor, measuring a pit length based on reflection light, on the disc, of the optical beam irradiated by the optical pickup and then detecting based on a result of the measurement that the spindle motor is in short condition. In the optical disc device, upon detection by the detector that the spindle motor is in short condition, the motor driving circuit stops the voltage application to the spindle motor.

According to such configuration, heating of the motor driving circuit caused by overcurrent can be avoided even when the spindle motor is in short condition.

Preferably, in the configuration described above, the optical disc device further includes a signal output section for outputting to a display section a signal for causing the display section to provide an alarming display upon detection by the detector that the spindle motor is in short condition.

According to such configuration, the user can be urged to repair the spindle motor.

For example, the detector may sequentially measure pit lengths for respective predetermined periods of time, may acquire largest pit lengths in the respective measurements, and may detect that the spindle motor is in short condition, based on a difference between the largest pit lengths corresponding to the adjacent measurements in measurement sequence.

DETAILED DESCRIPTION OF PREFERRED EMBODIMENTS

Figure 1:
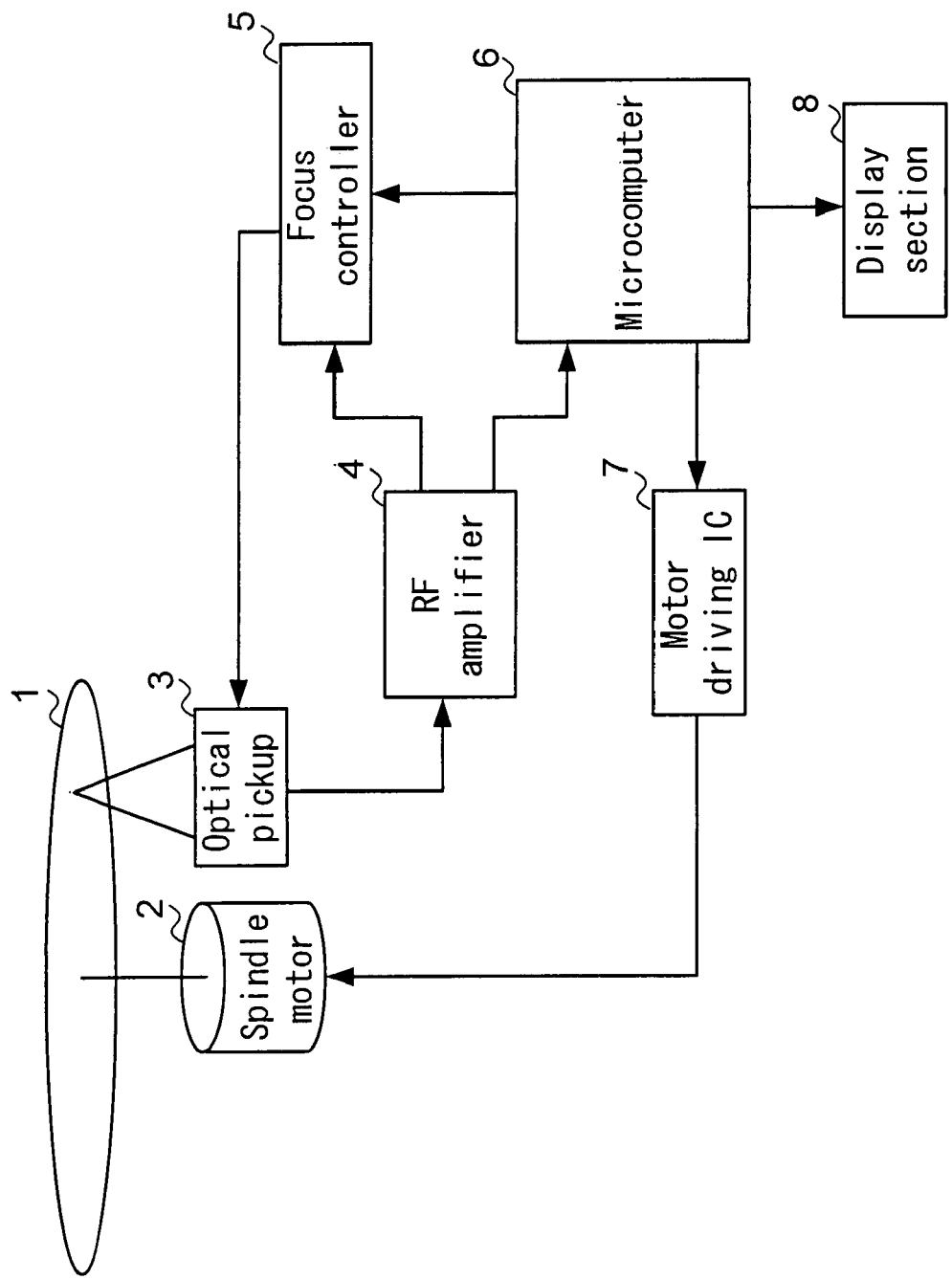
FIG. 1 is a schematic configuration diagram of an optical disc device according to the present invention.

Hereinafter, the embodiments of the present invention will be described with reference to the accompanying drawings. FIG. 1 shows schematic configuration of an optical disc device according to the invention.

The optical disc device according to the invention is provided with: a spindle motor 2, an optical pickup 3, an RF amplifier 4, a focus controller 5, a microcomputer 6, a motor driving IC 7, and a display section 8.

The spindle motor 2 rotates the disc 1 and is driven by the motor driving IC 7. The optical pickup 3 has an objective lens, an actuator, a laser diode, and a photodetector, all not shown. A laser beam emitted from the laser diode is condensed on the disc 1 by the objective lens, and the laser beam reflected on the disc 1 is received by the photodetector via the objective lens and converted into a current signal, which is outputted to the RF amplifier 4. The RF amplifier 4 converts and amplifies this current signal into a voltage signal to calculate and generate an RF signal and a focus error signal.

The focus controller 5, based on the focus error signal, outputs a driving signal to the actuator included in the optical pickup 3, whereby the objective lens is driven in the direction perpendicular to the recording surface of the disc 1.

The microcomputer 6 has a wavelength equalizer and an autoslicer, both not shown, converts the RF signal into a binary signal, and measures a pit length based on the binary signal and a clock signal. In addition, the microcomputer 6 outputs a driving signal to the motor driving IC 7 and a display signal to a display section 8.

The motor driving IC 7 amplifies the driving signal from the microcomputer 6 and applies a voltage to the spindle motor 2. The display section 8 has, for example, a liquid crystal panel, and displays characters and graphics based on the display signal from the microcomputer 6.

Figure 2A:
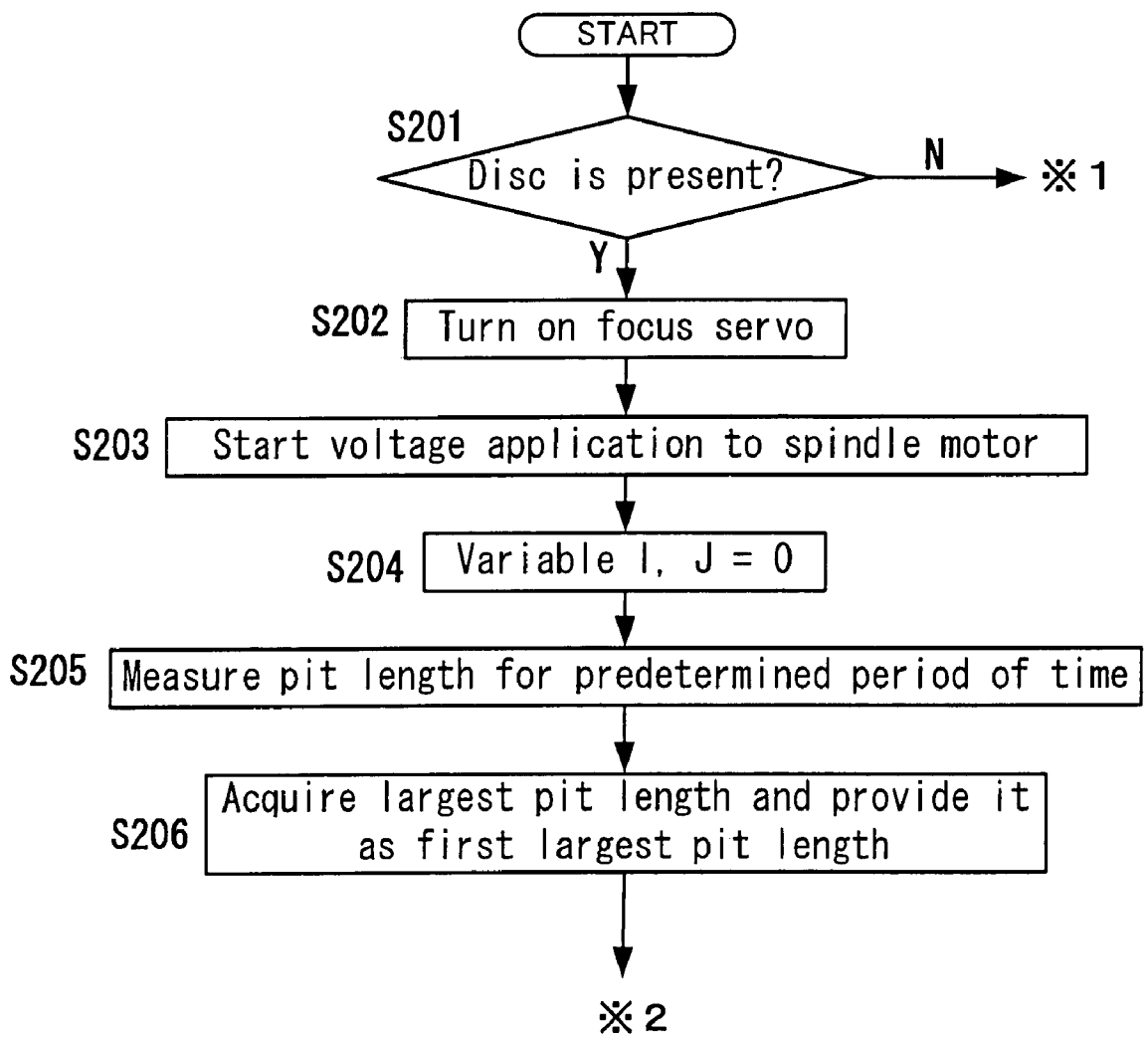
FIG. 2A is a flowchart for startup sequence of the optical disc device according to the invention.
Figure 2B:
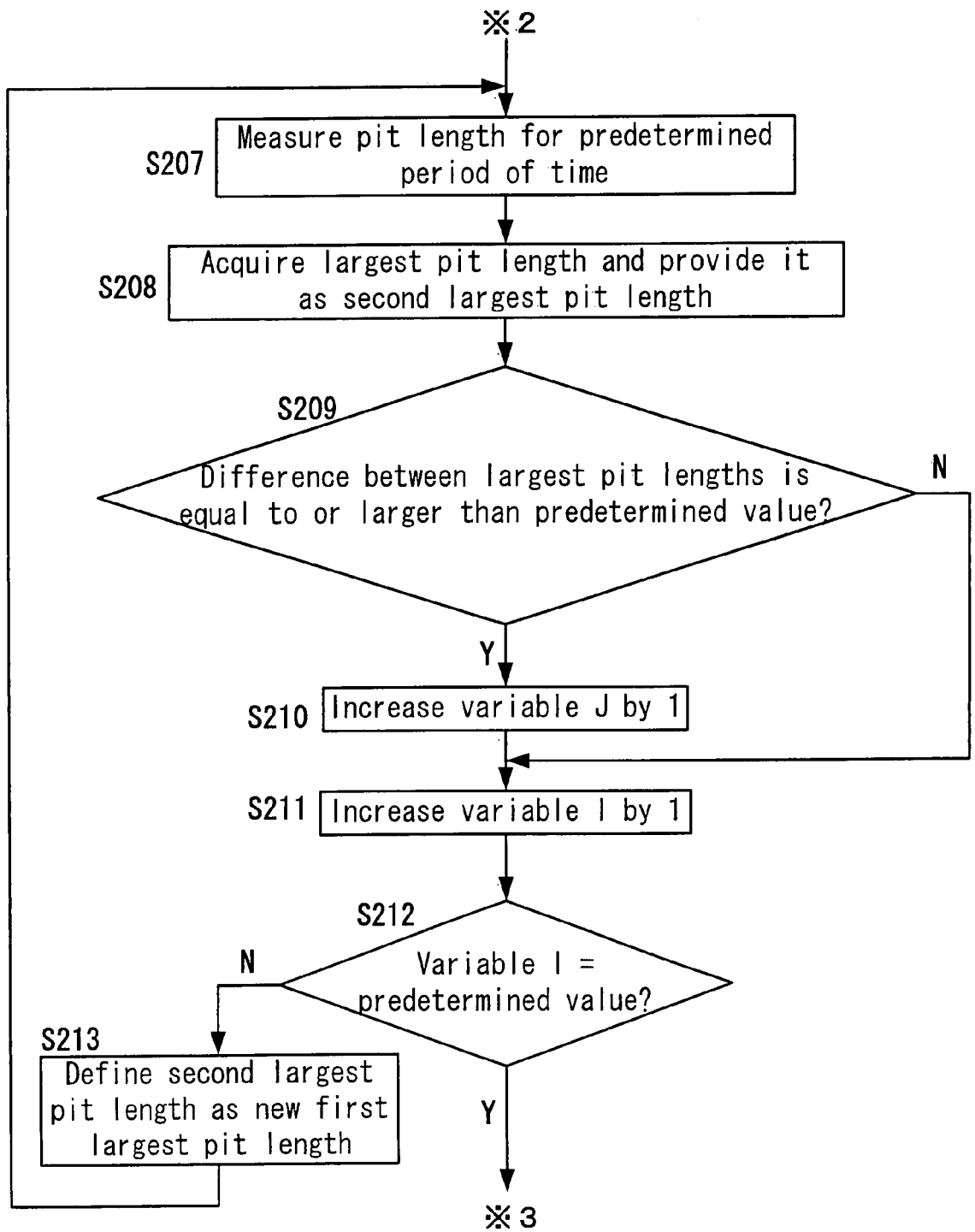
FIG. 2B is a flowchart for startup sequence of the optical disc device according to the invention.
Figure 2C:
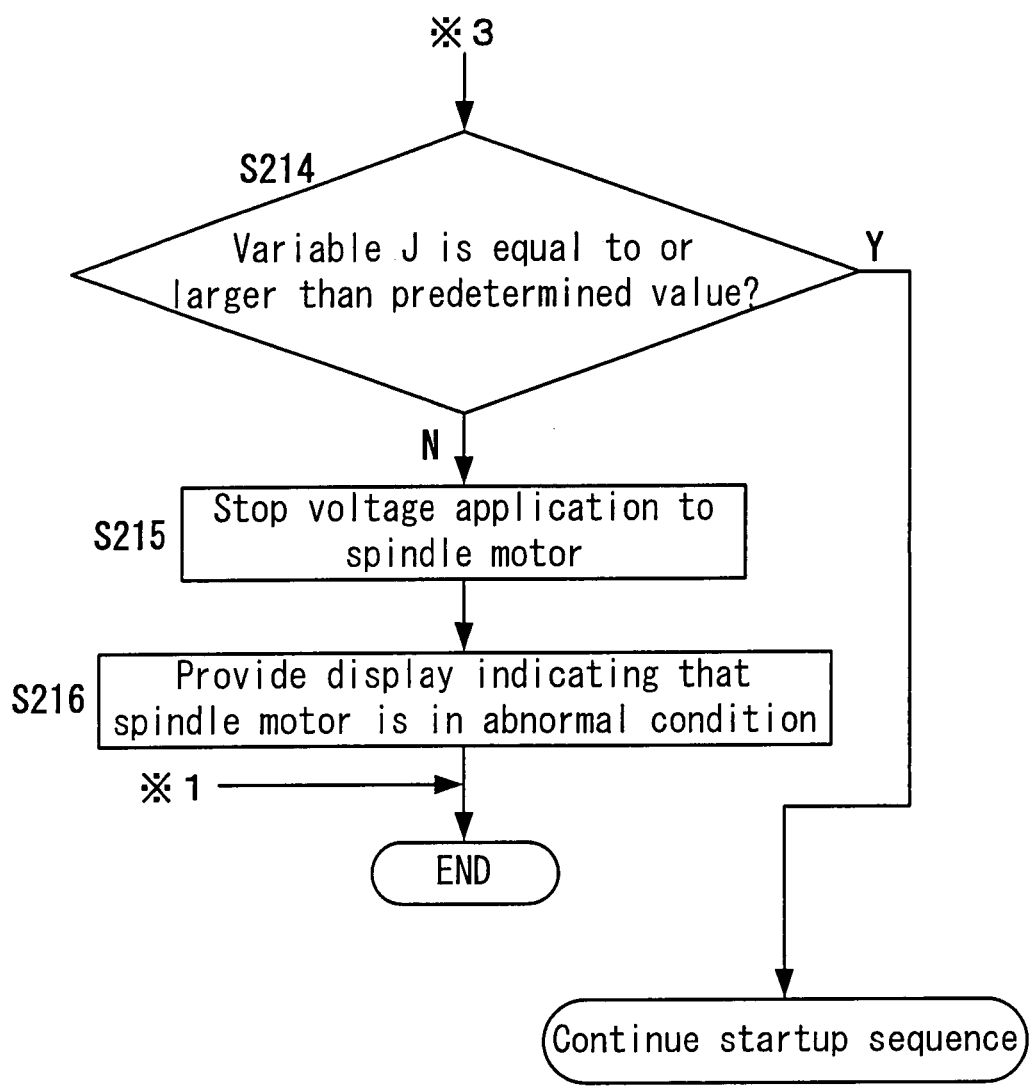
FIG. 2C is a flowchart for startup sequence of the optical disc device according to the invention.

Next, one example of startup sequence in the optical disc device according to the invention when the main power is on will be described, following flowcharts shown in FIGS. 2A, 2B, and 2C.

When the main power source is turned on, first in step S201, the microcomputer 6 determines the presence/absence of the disc. Here, for example, if the laser diode of the optical pickup 3 emits a laser beam and an input signal is provided from the RF amplifier 4, since this means that the laser beam has been reflected on the disc, the microcomputer 6 determines that a disc is present, while the microcomputer 6 determines that no disc is present if this input signal has not yet been provided. If the microcomputer 6 determines that no disc is present (N in step S201), the startup sequence is stopped. On the other hand, if the microcomputer 6 determines that a disc is present (Y in step S201), the sequence proceeds to step S202.

In step S202, the laser diode included in the optical pickup 3 emits a laser beam, the focus controller 5 sets a low speed servo parameter as a servo parameter, outputs a driving signal to the actuator included in the optical pickup 3 to bring the objective lens closer to the disc 1, turns on focus servo at a time when a focus error signal from the RF amplifier 4 has reached zero, and thereafter outputs a driving signal to the actuator based on the focus error signal and the set servo parameter described above, thereby achieving position control of the focal position of the objective lens on the recording surface of the disc 1.

Then in step S203, the microcomputer 6 releases standby state of the motor driving IC 7 and outputs a driving signal to the motor driving IC 7, which starts voltage application to the spindle motor 2. Here, if the spindle motor 2 is not in short condition, the disc 1 starts to rotate, while the disc 1 does not rotate if the spindle motor 2 is in short condition.

Then in step S204, the microcomputer 6 initializes variables I and J to zero.

Then in step S205, the microcomputer 6, based on an RF signal from the RF amplifier 4, measures pit lengths for a predetermined period of time. Subsequently, in step S206, the microcomputer 6 acquires the largest pit length from among the pit lengths measured, and defines it as a first largest pit length.

Then in step S207, the microcomputer 6, based on the RF signal from the RF amplifier 4, measures pit lengths again for a predetermined period of time. Subsequently, in step S208, the microcomputer 6 acquires the largest pit length from among the pit lengths measured, and defines it as a second largest pit length.

Then in step S209, the microcomputer 6 determines whether or not a value obtained by subtracting the second largest pit length from the first largest pit length is equal to or larger than a predetermined value. If this value is equal to or larger than the predetermined value (Y in step S209), the sequence proceeds to step S210. If this value is less than the predetermined value (N in step S209), the sequence proceeds to step S211.

In step S210, the microcomputer 6 increments the variable J by 1. Then in step S211, the microcomputer 6 increments the variable I by 1. In step S212, the microcomputer 6 determines whether or not the variable I has reached a predetermined value.

In step S212, if the microcomputer 6 determines that the variable I has not yet reached the predetermined value (N in step S212), the sequence proceeds to step S213. The microcomputer 6 defines the second largest pit length as a new first largest pit length, and then the sequence returns to step S207. Subsequently, in step S208, the acquired largest pit length is defined as a new second largest pit length, and in step S209, determination is made based on a value obtained by subtracting the new second largest pit length from the new first largest pit length.

If the microcomputer 6 determines that the variable I has reached the predetermined value in step S212 (Y in step S212), the sequence proceeds to step S214, where the microcomputer 6 determines whether or not the variable J is equal to or larger than a predetermined value. If the variable J is equal to or larger than the predetermined value (Y in step S214), the sequence continues under the assumption that the spindle motor 2 is not in short condition.

On the other hand, if the microcomputer 6 determines that the variable J is less than the predetermined value (N in step S214), the sequence proceeds, under the assumption that the spindle motor 2 is in short condition, to step S215, where the microcomputer 6 makes the motor driving IC 7 transit to standby state, so that the motor driving IC 7 stops the voltage application to the spindle motor 2. Here, the power source of the motor driving IC 7 may be cut.

Then in step S216, the microcomputer 6 outputs a display signal to the display section 8, which provides a display indicating that the spindle motor 2 is in abnormal condition, thereby stopping the sequence. Here, this display may be provided on an external television or the like by using an OSD section, not shown.

If the spindle motor 2 is not in short condition, the disc 1 starts to rotate as a result of the voltage application in step S203. The rotation of the disc 1 is accelerated; thus, the largest pit length acquired decreases over time. Consequently, the microcomputer 6 determines that the value obtained by subtracting the second largest pit length from the first largest pit length is equal to or larger than the predetermined value almost every time in step S209, the variable J increases in step S210, the microcomputer 6 determines that the variable J is equal to or larger than the predetermined value in step S214, and the startup sequence continues.

On the other hand, if the spindle motor 2 is in short condition, the disc 1 keeps stopping without starting to rotate even as a result of the voltage application in step S203, and thus the largest pit length acquired fluctuates only slightly over time. Consequently, the microcomputer 6 determines that the value obtained by subtracting the second largest pit length from the first largest pit length is smaller than the predetermined value almost every time in step S209. Since the sequence does not go through step S210, the variable J hardly increases. In step S214, the microcomputer 6 determines that the variable J is smaller than the predetermined value, and in step S215, the voltage application to the spindle motor 2 is stopped, thereby permitting avoiding heating of the motor driving IC 7 caused by overcurrent generated by the short condition of the spindle motor 2. Moreover, in step S216, the display section 8 provides α display indicating that the spindle motor is in abnormal condition, which can urge the user to repair the spindle motor.

What is claimed is:

1. An optical disc device comprising:
    a spindle motor for rotating a disc;
    a motor driving circuit for applying a voltage to the spindle motor to drive the spindle motor;
    an optical pickup for irradiating the disc with an optical beam; and
    a detector for, after the motor driving circuit starts voltage application to the spindle motor, sequentially measuring pit lengths based on reflection light, on the disc, of the optical beam irradiated by the optical pickup for respective predetermined periods of time, acquiring largest pit lengths in the respective measurements, and based on a difference between the largest pit lengths corresponding to the adjacent measurements in measurement sequence, detecting that the spindle motor is in short condition,
    wherein, upon detection by the detector that the spindle motor is in short condition, the motor driving circuit stops the voltage application to the spindle motor.

2. The optical disc device according to claim 1, further comprising a signal output section for outputting to a display section a signal for causing the display section to provide an alarming display upon detection by the detector that the spindle motor is in short condition.

* * * * *